United States Patent [19]

Schultz et al.

[11] 4,381,933
[45] May 3, 1983

[54] METHOD AND APPARATUS FOR SHAPING MOVING GLASS SHEETS BY SAGGING FOLLOWED BY ROLL PRESSING

[75] Inventors: Stephen J. Schultz, Pittsburgh, Pa.; Terry L. Wolfe, Evansville, Ind.

[73] Assignee: PPG Industries, Inc., Pittsburgh, Pa.

[21] Appl. No.: 345,494

[22] Filed: Jan. 25, 1982

[51] Int. Cl.³ .......................................... C03B 23/033
[52] U.S. Cl. .................................... 65/106; 65/107; 65/253; 65/273; 65/275; 65/286; 72/234
[58] Field of Search .............. 65/106, 107, 253, 273, 65/275, 286; 72/234

[56] References Cited

U.S. PATENT DOCUMENTS

| | | | |
|---|---|---|---|
| 409,047 | 8/1889 | Larkin | 72/234 X |
| 1,147,713 | 7/1915 | Fox | 72/234 |
| 1,946,240 | 2/1934 | Rohn | 72/234 X |
| 2,348,887 | 5/1944 | Drake | 49/84 |
| 3,223,499 | 12/1965 | Cypher et al. | 65/25 |
| 3,226,219 | 12/1965 | Jamnik | 65/170 |
| 3,245,771 | 4/1966 | Jamnik et al. | 65/106 |
| 3,245,772 | 4/1966 | Cypher et al. | 65/111 |
| 3,248,198 | 4/1966 | Jamnik et al. | 65/245 |
| 3,262,768 | 7/1966 | Carson | 65/104 |
| 3,284,182 | 11/1966 | Jamnik | 65/170 |
| 3,332,761 | 7/1967 | Fredley et al. | 65/25 |
| 3,342,573 | 9/1967 | Fredley et al. | 65/25 |
| 3,372,016 | 3/1968 | Rahrig et al. | 65/114 |
| 3,396,000 | 8/1968 | Carson et al. | 65/104 |
| 3,420,650 | 1/1969 | Humphreys | 65/94 |
| 3,497,340 | 2/1970 | Dennison et al. | 65/104 |
| 3,522,029 | 7/1970 | Carson et al. | 65/104 |
| 3,545,951 | 12/1970 | Nedelec | 65/104 |
| 3,701,644 | 10/1972 | Frank | 65/106 |
| 3,801,298 | 4/1974 | Bezombes | 65/104 |
| 3,820,969 | 6/1974 | Bogrets et al. | 65/184 |
| 3,831,239 | 8/1974 | Hoff et al. | 29/125 |
| 3,832,153 | 8/1974 | Bezombes | 65/291 |
| 3,856,499 | 12/1974 | Frank | 65/104 |
| 3,869,269 | 3/1975 | Knapp | 65/106 |
| 3,871,855 | 3/1975 | Frank | 65/245 |
| 3,881,906 | 5/1975 | Ritter, Jr. et al. | 65/104 |
| 3,891,420 | 6/1975 | Frank | 65/106 |
| 3,929,441 | 12/1975 | Frank | 65/106 |
| 3,934,996 | 1/1976 | Frank | 65/106 |
| 3,992,181 | 11/1976 | Frank | 65/104 |
| 4,028,086 | 7/1977 | Rahrig et al. | 65/273 |
| 4,043,783 | 8/1977 | Frank | 65/106 |
| 4,054,437 | 10/1977 | Ueberwolf et al. | 65/107 |
| 4,054,438 | 10/1977 | Presta | 65/107 |
| 4,123,246 | 10/1978 | Johnson | 65/104 |
| 4,139,359 | 2/1979 | Johnson et al. | 65/107 |
| 4,226,608 | 10/1980 | McKelvey | 65/106 |
| 4,305,746 | 12/1981 | Hagedorn et al. | 65/106 |

Primary Examiner—Arthur D. Kellogg
Attorney, Agent, or Firm—Edward I. Mates

[57] ABSTRACT

This invention relates to shaping glass sheets by roll forming to either simple or complex curvatures about a single axis of bending or to compound curvatures comprising components of curvature about mutually perpendicular axes of bending by a controlled, repeatable program of roll forming without causing the glass sheets to stop their forward movement during their shaping. The apparatus used to perform this process has a minimum of moving parts, thus minimizing maintenance problems and reducing downtime for maintenance and repair.

24 Claims, 8 Drawing Figures

METHOD AND APPARATUS FOR SHAPING MOVING GLASS SHEETS BY SAGGING FOLLOWED BY ROLL PRESSING

One embodiment of this invention represents a further improvement over the inventions described and claimed in U.S. Pat. Nos. 4,123,246 and 4,139,359 to Johnson and Wolfe. In these patents, a series of hot, flat glass sheets transfer from alternate conveyor rolls of cylindrical shape onto alternate forming rolls of transverse elevational curvature. The latter rolls increase the transverse curved lines of support for the moving glass sheets along the path of travel. The present invention incorporates additional rolls arranged in spaced pairs of gradually decreasing separation along the path of travel to roll press the glass sheets into more precise compliance with the desired shape than previously experienced after each glass sheet in turn has been sagged to approximately the shape of a shaped forming roll. Optionally, the roll pressed glass sheets may be altered to a final desired shape by cooling the opposite major surfaces of each roll pressed glass sheet at different rates of cooling before it reaches a temperature at which the major surface portions become set in a permanent configuration.

BACKGROUND OF THE INVENTION

1. Field of the Invention

The present invention relates generally to the production of shaped, tempered sheets of glass, and more particularly to an improved method of and apparatus for shaping and heat treating relatively thin glass sheets to very precise shapes.

Shaped glass sheets are widely used as side windows in vehicles such as automobiles or the like and, to be suitable for such application, the glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window to damage resulting from impact.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. To promote efficient and large scale production, discrete glass sheets are conventionally heated, bent and cooled while being moved continuously along a fixed path and successively through a heating section, a shaping section such as a roll forming section, and a cooling section. To achieve satisfactory temper, the temperature of the glass sheet must be above a predetermined minimum level so as to maintain the core or interior thereof above a deformation temperature upon being exposed initially to cool tempering medium at the cooling section. The residual heat remaining in glass sheets of previous commercial thicknesses, such as those having nominal thicknesses ranging from 4.5 millimeters to six millimeters, is generally sufficient after shaping for immediate advancement to the cooling section for exposure to the tempering medium. Thus, the heat initially imparted to a relatively thick glass sheet to bring it to proper temperature for shaping can also be utilized in the final heat treating operation.

However, within the last several years, considerably emphasis has been placed on the use of thinner and thinner glass sheets for automobile side windows as a means of reducing overall weight of the autos as a means to obtain better fuel mileage. This has posed problems in shaping and tempering, due to the lesser ability of the thinner sheets to retain heat and the aforementioned conventional process of bending and treating glass sheets does not lend itself to the processing of these relatively thin sheets, such as those having nominal thicknesses ranging from less than three millimeters to four millimeters (90 mils to 160 mils). As the thickness of the glass decreases, the rate of heat loss increases and the heat initially imparted to such thin sheets is quickly dissipated upon leaving the heating atmosphere of the furnace and during the relatively cool shaping step. Attempts to solve these problems by initially overheating the thin glass sheets have not been successful because of the consequent loss of control of the glass shaping process and the degradation of the surface quality of the finished glass as a result of heat stains, roll ripple distortion, and the imposition of roll marks in the surface of the heat-softened glass sheet.

Consequently, roll forming has been developed as a technique for shaping and tempering glass sheets at a high production rate. One of the benefits of the roll forming process is the rapid removal of each individual glass sheet from the heating section or furnace through the shaping section and into the cooling section. In the roll forming method, glass sheets are conveyed without stopping through heating, shaping and cooling sections along high speed glass sheet conveyor means to drastically reduce the time needed to traverse the distance between the exit of the heating section or furnace to the cooling section to a minimum, preferably under five seconds. Under such circumstances, thin glass sheets can be tempered without imparting such a high initial temperature at the furnace that shape control and control of surface quality is lost as a consequence of insuring that the temperature at the core of each glass sheet does not cool to below the minimum temperature needed on arrival at the cooling section to assure adequate temper.

Tempering medium is applied against the opposite major surfaces of the shaped glass sheets. In the past, a movable gate was sometimes provided to minimize back flow of tempering medium into the shaping section. This involved the inclusion of a moving element whose movement must be correlated with the movement of individual glass sheets from a shaping section to a cooling section.

In roll forming as practiced in the prior art, either a continuous glass ribbon or a series of discrete glass sheets is heated to or above the deformation temperature of the glass and passed in a continuous motion through one or more shaping stations where the shape of the glass is changed from a flat configuration to a shaped configuration. Shaping individual glass sheets by roll forming, particularly those of non-rectangular shape having one or both longitudinal side edges extending obliquely of the path of glass sheet movement, is more difficult to perform than roll forming a continuous ribbon, because individual glass sheets have leading edges as well as side edges that are prone to be distorted by a high speed shaping operation, whereas only the side edges of a continuous ribbon are more prone to distortion than the main body of the glass.

Glass sheets have been warped or distorted into different configurations, that is, from flat to curved or from curved to flat by either differentially heating or differentially cooling the opposite glass sheet surfaces. Shaped glass sheets have been subjected to a slight pressure differential to maintain the shaped glass sheets in frictional engagement with shaped rotating conveyor rolls that propel shaped glass sheets through a cooling section where chilling medium is applied to the heated shaped glass sheets rapidly enough to impart a temper thereto. However, thin glass sheets distorted solely by differential heating and/or differential cooling have been known to develop an "oil canning" effect in which the thin distorted glass sheet flexes uncontrollably between metastable states of opposite flexure compared to a flat sheet.

The history of prior art attempts to shape glass sheets continuously without causing the glass sheets to stop for the shaping step so as to obtain as high a production rate of shaped glass sheets as possible and the problems associated with shaping thin glass sheets by differential heating and/or differential cooling will be understood better in the light of a description of the prior art that follows.

2. Description of the Prior Art

Many patents have been issued on roll forming.

U.S. Pat. No. 2,348,887 to Drake moves heated glass sheets between a pair of aligned pressure rolls 32 and 33 of cylindrical configuration which force the bottom surfaces of the glass sheets to ride over a series of spaced bending rolls 31 of cylindrical configuration mounted for rotation along spaced lines that extend transversely of a curved path corresponding to the shape desired for the bent glass sheets. The shapes imparted to the moving glass sheets are limited to cylindrical curvatures of uniform radius about an axis transverse to the path of glass movement.

U.S. Pat. Nos. 3,226,219 and 3,284,182 to Jamnik and U.S. Pat. Nos. 3,245,771 and 3,248,198 to Jamnik and Pelzl form a continuous ribbon of glass into cross-sectional contours of shaped configuration by passing the ribbon between consecutive pairs of rolls comprising complementary upper and lower forming rolls of gradually increasing severity of shape. These patents shape continuous ribbons of glass rather than discrete glass sheets.

U.S. Pat. No. 3,420,650 to Humphreys forms a continuous ribbon of U-shaped configuration by first tensioning the flat ribbon to adjust its width while hot and then shaping the hot, tensioned ribbon to a shaped contour. This patent treats a continuous ribbon rather than discrete glass sheets.

U.S. Pat. No. 3,820,969 to Bogrets moves forming elements toward one another to make profiled articles from a ribbon of hot moving glass. The glass is shaped relative to an axis extending along the path of glass movement. The movement of a forming element must be correlated with the movement of the other forming element and with the glass movement for this system to operate effectively.

U.S. Pat. No. 3,881,906 to Ritter et al sags heated glass sheets to intermediate shapes of progressively increasing curvature transverse to their path of movement by conveying said heated glass sheets on successive, contoured, rotating, conveyor rolls of increasing transverse curvature en route to a shaping station. The entire weight of a transversely extending leading element of the glass is borne entirely along the side edge portion of the glass as it transfers from one contoured forming roll to the next. Consequently, the lateral edges kink away from the overall curvature desired and it is necessary to stop each partially shaped glass sheet at a shaping station where its shaping is completed by the inertia gravity method which involves the use of a shaping mold that moves in an upward vertical direction transverse to both the glass movement path and the axes of rotation of the contoured rolls to engage the glass sheet margin while the glass sheet forward movement is stopped. This patent also provides a moving gate between the shaping station and the cooling station to limit back flow of tempering medium from the cooling station to the shaping station. Therefore, this patented apparatus must coordinate the movement of a shaping mold and a gate with the glass sheet movement.

U.S. Pat. No. 4,305,746 to Hagedorn et al discloses a glass sheet bending method and apparatus in which heat-softened glass sheets are preliminarily bent while conveyed on spaced conveyor rolls into a shaping station wherein each glass sheet, in turn, is stopped for shaping by pressurized engagement between an upper press member and a lower press member having a first shaping surface of outline configuration and a shaping pad within said outline, said lower press member being movable to lift the glass sheet off the spaced conveyor rolls into pressurized engagement against the upper press member. The need to stop the glass sheet at the shaping station limits the maximum rate of production.

U.S. Pat. No. 3,545,951 to Nedelec, U.S. Pat. Nos. 3,801,298 and 3,832,153 to Bezombes, U.S. Pat. No. 3,831,239 to Hoff et al and U.S. Pat. No. 4,054,437 to Ueberwolf et al shape moving glass sheets between shaped conveyor rolls that support the lower surface of moving heat-softened glass sheets and a movable upper shaping member of complementary configuration. The apparatus of these patents provides a family of simple curves about a single axis transverse to the path of glass sheet movement. These patents require the shaped conveyor rolls to rotate between different orientations from a flat glass supporting position to a shaped glass supporting position. The change in orientations must be correlated with glass sheet movement to obtain desired results.

U.S. Pat. No. 4,054,438 to Presta arranges a series of rotatable rolls mounted on angularly adjustable shafts to provide a series of spaced, curved supports that control the transverse shape imparted to hot, moving glass sheets.

U.S. Pat. Nos. 3,701,644; 3,856,499; 3,871,855; 3,891,420; 3,929,441; 3,934,996; 3,992,181 and 4,043,783 to Frank; and U.S. Pat. No. 3,869,269 to Knapp disclose roll forming apparatus capable of shaping a succession of discrete moving glass sheets to either simple shapes provided with one component of shape about either an axis extending longitudinally of the path of glass sheet movement or about an axis extending transversely thereof or compound shapes involving various combinations of two components conforming to said simple shapes. In addition, the roll forming apparatus of this group of patents is capable of shaping glass sheets to either simple or compound shapes involving non-uniform radii of curvature. The Knapp patent includes special idler rolls mounted in positions to reduce tip curl by engaging the tip portions of one surface only of roll formed glass sheets.

However, even though this last group of patents provided high production rates and the greatest variety of simple and compound shapes for glass sheets ever attained as of the time of this invention, the apparatus comprised movable parts whose movement between spaced apart positions on opposite sides of a path of movement provided by conveyor rolls for glass sheets and glass engaging positions to one side of said conveyor rolls had to be correlated with the glass sheet movement between the movable parts. This correlation required constant monitoring and frequent adjustment of moving parts. In addition, it was necessary to spend considerable time for set up and adjustment of the apparatus when production patterns were changed to insure that the movements of the rotating shaping rolls toward and away from one another correlate properly with the movement of discrete glass sheets therebetween.

U.S. Pat. No. 4,226,608 to McKelvey discloses curved rolls of increasing severity of curvature along a glass sheet path of travel for shaping hot conveyed glass sheets. Means is provided to adjust the transverse curvature of the rolls, which engage the bottom surface only and thus do not control tip curl.

Many patents have also issued on thermal warpage of treated glass sheets. These patents use differential heating or cooling or a combination of differential heating and differential cooling against the opposite surfaces of the glass sheet to shape the glass to a different shape from its original shape.

U.S. Pat. No. 3,223,499 to Cypher and Davidson differentially heats the glass sheet while conveyed on a roller hearth to induce an upward warp, then the heat differential is reduced to reduce the warp while continuing to heat the sheet. The heated sheet may be supported on a roller hearth or a gas hearth.

U.S. Pat. No. 3,245,772 to Cypher and Davidson covers thermal warping by differential heating while conveying glass sheets on a roller conveyor extending through a furnace.

U.S. Pat. No. 3,262,768 to Carson temporarily warps a selected edge portion of glass sheet away from an outline mold to which it has been shaped by gravity sagging by differentially applying cooling fluid against the opposite glass sheet surfaces so as to ensure better cooling of the warped edge portion of the shaped glass sheet supported on the outline mold for bending.

U.S. Pat. No. 3,332,761 to Fredley and Sleighter discloses the application of cold air upward at a rate sufficient to provide glass sheet support while annealing glass sheets in spaced relation over a gas hearth.

U.S. Pat. No. 3,342,573 to Fredley and Sleighter discloses supplying a support gas at different pressures at different parts of a gas hearth.

U.S. Pat. No. 3,372,016 to Rahrig, O'Connell and Ferguson discloses differentially heating a glass sheet to bow the sheet upward and then heating from below only to tend to reverse the warp that is formed by the initial differential heating.

U.S. Pat. No. 3,396,000 to Carson, Ferguson, Ritter and Hymore discloses quenching opposite surfaces of the glass sheet at preselected different rates to warp a flat sheet to a desired curvature.

U.S. Pat. No. 3,497,340 to Dennison and Rigby discloses a differential rapid cooling of opposite sides of glass sheets through the tempering temperature range to cool the faster cooling side through the temperature tempering range then reducing the faster cooling rate to maintain that side cooled at lesser cooling rate at a temperature high enough to maintain the glass sheets at a first configuration and then continuing cooling until the sheets are no longer deformable through viscous flow whereby a second configuration forms in the glass sheet.

U.S. Pat. No. 3,522,029 to Carson and Ritter discloses shaping glass sheets by differentially cooling one surface from the central area to an edge area and also shaping glass sheets by differential cooling of the opposite surfaces during movement along a multiple speed conveyor.

U.S. Pat. No. 4,028,086 to Rahrig and Revells discloses passing glass sheets through a quench area where a pressure differential between the top and bottom surfaces is applied to force the glass sheet upward against upper conveyor rolls and to warp or shape the sheet by cooling its bottom surface faster than its top surface.

None of the patents disclose shaping a moving glass sheet by roll forming to one configuration by heat sagging the sheet to conform to rotating forming rolls of transverse curvature and changing its configuration by consecutive roll pressing over increasing lines of pressing to eliminate any deviations such as tip curl where the glass sheet is warped from its desired transverse shape.

SUMMARY OF THE INVENTION

The present invention provides a method and apparatus for shaping glass sheets by roll forming wherein a series of discrete glass sheets moves through a roll forming station of novel construction at a high speed without stopping, thereby producing shaped glass sheets at a high rate of production according to a controlled, predetermined, repeatable program of roll forming. The roll forming section of one specific embodiment of the present invention comprises rotatable rolls that are fixed in position relative to one another. The rolls are adjustable for vertical positioning relative to one another along a path of movement for glass sheets in such a manner as to provide controlled support for the main body of each glass sheet as its lateral edges are lifted gradually relative to the main body of the glass to provide controlled transfer of the glass sheet support at a transition portion of the roll forming section from rigidly supported, rotating conveyor rolls of cylindrical configuration to complete support by rigidly supported, shaped, rotating forming rolls of transverse configuration of curved elevation. This gradual transfer of support provides control of the uniformity of glass sheet shaping from sheet to sheet. However, when the shaped sheet moves over concavely shaped, rotating forming rolls in the downstream end of the shaping station toward the cooling station, the lateral ends of the glass sheet tend to bow upward and produce a phenomenon called tip curl. Mounting a forming roll of complemental shape above the downstream forming roll of the shaping station limits the severity of tip curl. The downstream pair of closely spaced forming rolls of complemental shape must be spaced from one another by a vertical space that is at least the glass sheet thickness. If this space is too narrow, it will bar the passage of a glass sheet into the cooling station unless the glass sheet develops a limited tip curl. If the space is large enough to accommodate a glass sheet of thicker dimension and/or one that has developed considerable tip curl, a draft of cold tempering medium moves upstream from the cooling station to cool the glass sheet prematurely at a rate insufficient to insure an adequate temper.

According to a preferred embodiment of the present invention, after the moving glass sheet moves into approximate conformity with the last of a series of rotating forming rolls of transverse curved elevational shape in the upstream portion of the roll forming section, it moves over additional rotating forming rolls of transverse curved elevational shape that are mounted in pairs with upper rotating forming rolls of complementary transverse curved elevational shape forming the other forming roll of each forming roll pair. The complementary forming rolls of each pair are vertically spaced from one another by a distance that gradually diminishes from pair to pair along the path of travel for the glass sheets.

The lower forming rolls of each pair are mounted along a continuation of the path provided by the rotating forming rolls in the upstream portion of the roll forming section. The upper forming rolls of each pair are adjustably mounted relative to the location of the corresponding lower forming rolls of each pair so that the vertical distance between the downstream pair of forming rolls barely exceeds the thickness of glass sheets processed. By this construction, if a glass sheet develops tip curl after sagging by gravity, the pairs of forming rolls roll press gradually increasing transverse width portions extending inward from the opposite transverse edges of the moving glass sheets to compensate gradually for deviations in shape due to tip curl without barring the passage of the glass sheets between the pairs of forming rolls.

It is also an optional variation of this invention to bend glass sheets to a consistent configuration by a combination of the present invention of roll forming with differential cooling. A first configuration is imparted to the glass sheets during their roll forming by sagging the sheets downward by gravity toward the upstream forming rolls and this first configuration is changed to a series of modified transverse elevational shapes by the multiple roll pressing just described and further changed to a desired permanent configuration by applying cooling medium simultaneously against the opposite major surfaces of the sheets at rates sufficiently different to significantly alter the shape imparted to the glass sheets by the multiple roll pressing steps. The roll pressing steps make it less likely that the distortion imparted to the glass as a consequence of differential cooling will cause the glass sheets to develop a so-called "oil can" effect where the glass flexes out of control between metastable states of curvature in opposite senses relative to a flat glass sheet.

According to a specific embodiment of the present invention to be used with or without the differential cooling arrangement, the apparatus for shaping glass sheets by the roll forming method of the present invention comprises means to deliver heat-softened glass sheets to a roll forming section one sheet at a time. The means comprises a tunnel-type furnace extending from an entrance to an exit and a roller conveyor comprising a plurality of transversely extending rolls of cylindrical configuration longitudinally spaced from one another from upstream of said furnace entrance to beyond said furnace exit to provide a plurality of spaced, aligned lines of support defining an essentially straight path of movement for a series of said glass sheets through said furnace and comprising means to deliver one glass sheet at a time to a roll forming section.

The roll forming section has two portions. Its first or upstream portion (commonly termed a transition portion) comprises a roller conveyor extension extending in an obliquely downward direction from adjacent the furnace exit and comprising a first series of transversely extending conveyor rolls of cylindrical configuration longitudinally spaced from one another along a common upper tangential plane defining a straight line extending obliquely downward relative to said straight path in a downstream direction from said exit, and a second series of shaped rotating forming rolls, each of which is located intermediate a different adjacent pair of said first series of conveyor rolls along a path inclined less downwardly or upwardly relative to said downwardly oblique line.

In the first portion of the roll forming section of the specific embodiment, each forming roll has a given transversely curved configuration. Each succeeding forming roll in the first portion of said roll forming section is mounted for rotation on a shaft, and preferably comprises a curved shaping surface of concave elevation. The transversely curved configuration of each forming roll in the first portion of the roll forming section conforms to the transverse curvature of concave elevation formed by each of the other forming rolls in the preferred apparatus embodiment of this invention.

Each shaft that supports a forming roll included in the second series is rigidly supported in support housings. Each of the latter is fixed in a unique position relative to a roll support structure so as to support rigidly each successive forming roll in such a position that the curved upper surface of each successive forming roll has a larger portion of its said curved configuration disposed at a higher elevation relative to the obliquely extending straight line defined by the common upper tangential plane of said additional conveyor rolls.

The combination of alternate forming rolls and additional conveyor rolls so disposed enables the first or transition portion of the roll forming section to support successive increments of continuously moving glass sheets on increasingly shorter straight lines of support at their transverse center portions alternating with shaped lines of support at the lateral side edges that gradually increase in length from the side edges to the center transversely of the path taken by the glass sheets through the roll forming section. Supporting part of the mass of the glass sheet on the central portion of the additional conveyor rolls while periodically increased transverse end portions are supported by rotating forming rolls controls the glass sheet shaping in a manner that reduces edge kinking as the flat, heat-softened glass sheets are transferred from the furnace to gradually develop a shape transverse to their path of movement that is related to the transverse curvature common to said rotating forming rolls according to a controlled program of shaping without requiring movable forming rolls whose movement transverse to the glass sheet requires coordination with the moving glass sheets.

In the method performed by this apparatus, each glass sheet in the series is heated to at least its deformation temperature. The shaping operation begins with the longitudinal increment of the leading edge thereof supported across its entire width on a rotating cylindrical surface of the first additional conveyor roll. Then said leading edge increment moves over a first rotating forming roll, which supports the leading edge increment at its transverse extremities only on its shaped rotating surface. Alternately, the leading edge increment is supported on successively shorter lines of support extending transversely outward from its transverse center portion and successively longer curved lines of support along its transversely opposite side edge portions until the lines of support extending inward from its transverse extremities merge to form at least one continuous curved line of support extending transversely of the path of glass sheet movement and the transverse center support of cylindrical configuration is eliminated altogether. Each longitudinal increment of the glass sheet in turn follows a program of rotating roll support such that at the end of the first portion of the roll forming section an entire transverse dimension of a moving glass sheet is supported by a rotating roll of curved configuration. This gradual transfer of the glass sheet increment by increment from support by cylindrical rolls to support by rolls of curved configuration at the transition portion of the roll forming section improves the control of the shaping operation and reduces the tendency of the glass sheet to kink at its transverse edges.

In an alternate form of this invention, the first or upstream portion of the roll forming section may comprise a series of rotatable forming rolls of increasing severity of transverse elevational shape along the path of glass sheet travel. Each sheet of a series of glass sheets is delivered to said upstream portion at its deformation temperature so that it sags as it moves through the upstream portion. Either embodiment of upstream portion may be used in combination with a preferred embodiment of downstream portion of a roll forming section to be described.

According to a specific embodiment of the present invention, the roll forming section also includes a second portion (or downstream portion). In the second portion, additional rotatable, lower forming rolls having the same transverse configuration as the last rotatable forming roll in said upstream portion are disposed downstream of the aforesaid first portion of said roll forming section. Each additional lower forming roll forms a pair with a corresponding upper forming roll in the second portion of the roll forming section. Each upper forming roll is aligned with a different one of said additional lower forming rolls. These aligned forming rolls are adjustably mounted for spacing successive pairs vertically apart by distances that diminish from pair to pair in a downstream direction until a distance slightly greater than the thickness of the shaped glass sheets separates the corresponding rolls of the downstream pair.

The upper forming rolls of each pair have transverse elevational shapes that are complemental to the shapes of the additional lower forming rolls. In this manner, should a glass sheet become distorted due to tip curl, the shape that is imparted to the glass sheets moving along the first portion of the roll forming section is maintained within limits defined by the vertical spaces between the corresponding upper and lower forming rolls of the pairs of forming rolls. To accomplish this feature, the vertical space between the upper forming roll and lower forming roll of the upstream pair is sufficiently greater than the glass sheet thickness by an amount sufficient to permit a shaped glass sheet having substantial tip curl to pass between the rotating forming rolls of the upstream pair, yet not so great that the upstream rolls roll press more than the curled tip portions only.

As the glass sheet continues through the second portion of the roll forming section, the successive roll pairs roll press increasingly wider transverse side portions until the downstream roll pair that is separated by a distance barely greater than the glass sheet thickness roll presses substantially the entire transverse dimension of said glass sheet. The forming roll pairs comprise a roll pressing portion of said roll forming section of apparatus conforming to the present invention.

The apparatus may also include a cooling section. Additional rolls having transverse curvatures approximating those of the lower forming rolls are adjustably mounted to said cooling section to provide a smooth continuation of the path along which the lower forming rolls are disposed. The additional rolls are located in the upstream portion of the cooling section to at least a position within the cooling section where the glass sheet surfaces are set and provide support to maintain the transverse shape developed by roll forming, so they will be referred to as curved support rolls.

When the apparatus is used to perform a simple bend about an axis parallel to the path of movement for the glass sheets through the furnace, all of the transversely shaped rolls in the transition portion of said forming section, the lower additional forming rolls of the aligned forming roll pairs in the roll pressing portion of said roll forming section and the curved support rolls in the upstream portion of the cooling section are mounted in a straight horizontal line.

When glass sheets are to be shaped to a compound curvature, the forming rolls of the transition section are interspersed among the conveyor rolls of the roll forming section along a curved first portion of a path of arcuate longitudinal elevation. This curved path is correlated with a longitudinal component of shape to be imparted to the glass sheets transverse to the transverse component imparted by the transverse curvature of the forming rolls. The lower forming rolls of the pairs of aligned forming rolls and the curved support rolls in the upstream portion of the cooling section are mounted along a smooth continuation of said curved path of arcuate longitudinal elevation. The rigid support of the aforesaid shaped rolls in the roll forming section and in the upstream portion of the cooling section provides glass sheet support at spaced lines transverse to a smooth continuing longitudinal curve that imparts and maintains a component of longitudinal curvature until the glass surfaces are cooled and hardened sufficiently to preserve the smoothness of the glass surfaces after the sheets traverse the upstream portion of the cooling section.

In each embodiment, the close spacing between the aligned pairs of rolls in the roll pressing portion provides an effective barrier to "blow-back" toward the roll forming section of tempering medium applied against the opposite major surfaces of the roll formed glass sheets in the cooling section. This barrier is even more effective in case the additional lower forming rolls are supported in closely spaced relation below upper forming rolls of complementary curvature that are disposed along a longitudinally curved line defining the path of glass movement as is the case when the forming rolls are adjusted for shaping glass about two mutually perpendicular axes of curvature characteristic of a compound or complicated bend. Furthermore, this aspect of this invention protects the glass sheets from exposure to blasts of tempering fluid prematurely by providing barrier means comprising elements that remain fixed in preselected positions and need not be moved in synchronism with the movement of glass sheets into the cooling section.

The forming rolls and the curved support rolls are preferably constructed of a plurality of curved shafts along which are mounted a plurality of segments having loose tongue-in-groove connections. It is preferable that the segments have relatively short lengths to enable the segments to conform in end-to-end relation to the shape of the curved shaft on which each segment is mounted. One end segment is drivingly connected to a drive sprocket. The opposite end segment is mounted against a spring that compresses the couplings between adjacent segments. Thus, all the segments are freely rotatable with respect to the shafts. When the drive sprockets for the forming rolls are driven in unison, the forming roll segments rotate at the same peripheral speed. This feature reduces rub marks that are developed in hot glass sheets when the glass surfaces are so hot and soft that marking due to large differences in peripheral speeds of different portions of the rotating forming rolls or between different rotating forming rolls causes roll marks.

It is desirable to lessen the distance between adjacent shaped forming rolls once the glass has assumed a shape approximating the curved configuration of the forming rolls in the first portion of the roll forming section. According to this invention, the forming rolls comprising thin curved shafts and spring-loaded, loosely interfitting segments permit closer spacing between adjacent shaped forming rolls in the direction of glass sheet movement than many other prior art shaped forming rolls. The preferred type of forming rolls and those provided in the upstream portion of the cooling section are described in greater detail in U.S. Pat. No. 4,311,509 of William D. Reader and Terry L. Wolfe. However, it is also within the gist of this invention to arrange curved forming rolls of different constructions, such as those found in U.S. Pat. No. 4,226,608 to Harold E. McKelvey, for example, where the forming rolls in the upstream portion of the roll forming section may increase in severity of curvature along the path of glass sheet movement. These curved forming rolls of different construction may be used in combination with the pairs of opposed forming rolls as well as the curved support rolls in the cooling section that have the same transverse elevational shape as the downstream forming roll in the upstream portion of the roll forming section.

Another optional feature of this invention is the provision of roof structure having heat-reflecting properties that face the roll forming section of the illustrative apparatus. In the absence of the heat-reflecting roof structure, the glass sheets would be exposed to the ambient atmosphere and would be subject to premature and/or non-uniform cooling that would limit the temper and its uniformity attainable with this apparatus.

The various elements of the present invention will be understood more clearly in the light of a description of a specific embodiment of this invention which follows.

DESCRIPTION OF THE DRAWINGS

In the drawings which form part of the description of the specific embodiment of this invention, and wherein like reference numbers are applied to like structural elements.

DESCRIPTION OF THE SPECIFIC EMBODIMENT

Figure 1:
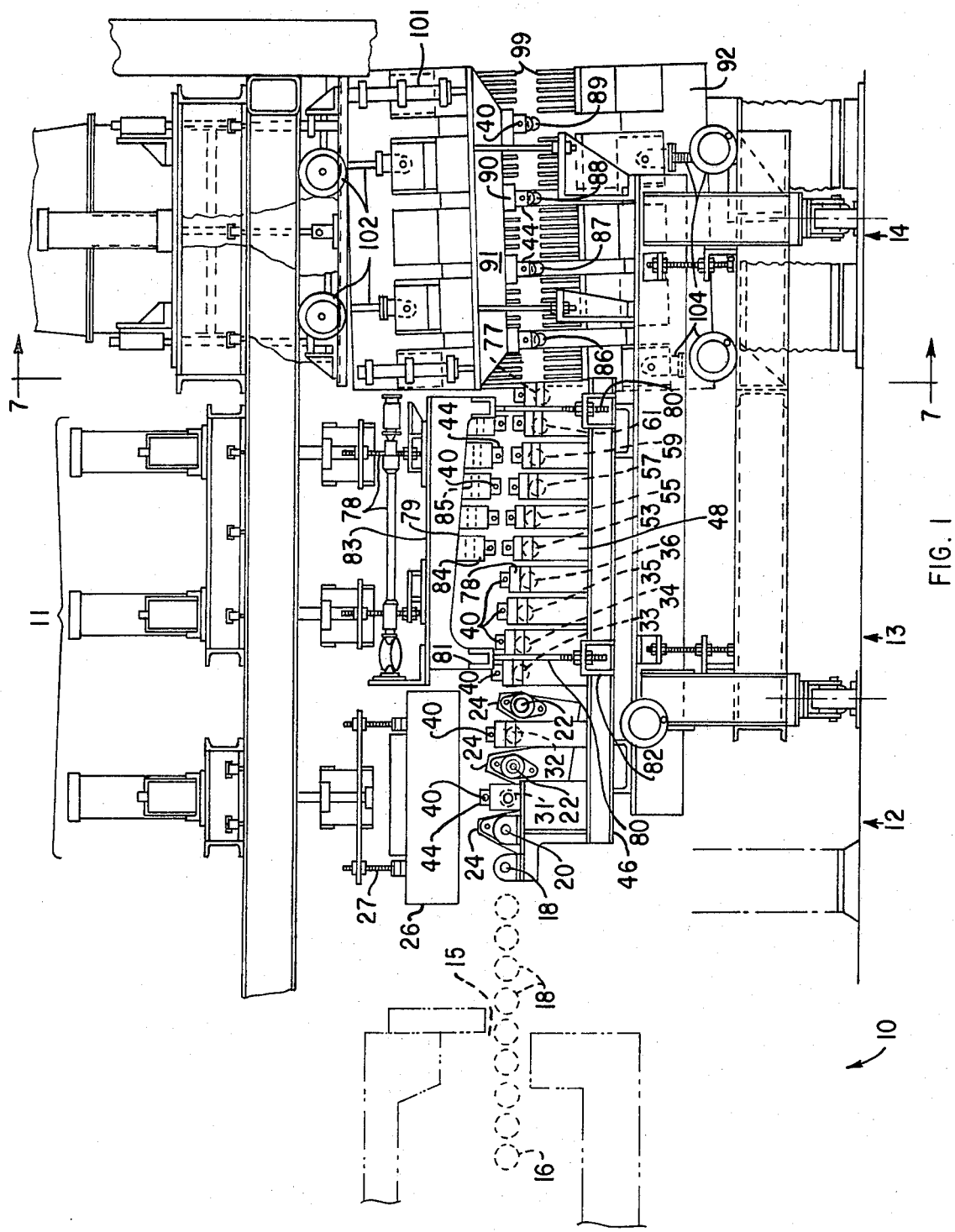
FIG. 1 is a longitudinal assembly view of a specific embodiment of the present invention showing the relative arrangement of conveyor rolls and forming rolls of a roll forming section of apparatus conforming to the present invention and its relation to a heating furnace and a cooling section.
Figure 2:
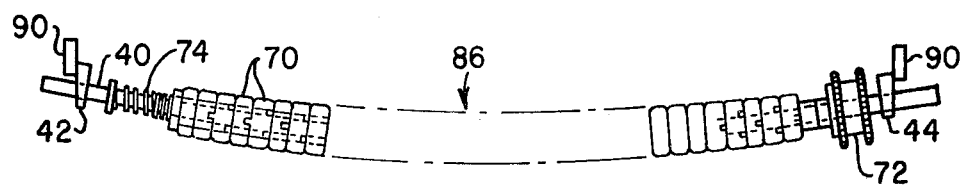
FIG. 2 is an enlarged transversely extending, elevational view of a curved support roll of the type used in the cooling section, but which has construction similar to those of forming rolls included in the illustrative embodiment of the roll forming section, except for its manner of support.
Figure 3:
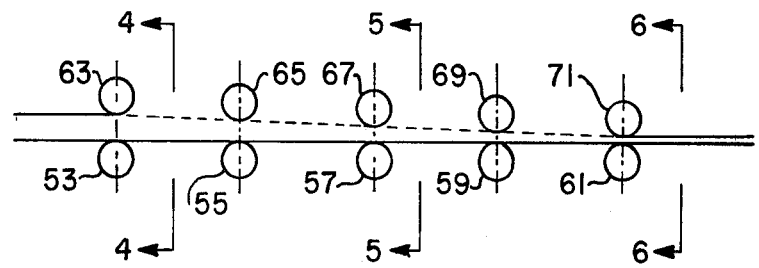
FIG. 3 is an enlarged, diagrammatic view of the arrangement of successive forming roll pairs in the downstream portion of the roll forming section of apparatus conforming to FIG. 1 with certain structural elements omitted to avoid confusion.

Referring to the drawings, a specific embodiment of this invention incorporates a tunnel-type furnace 10 followed by a roll forming section 11 composed of an upstream, transition portion 12 and a downstream, roll pressing portion 13, followed by a cooling section 14 disposed in closely spaced end-to-end relation to one another. The furnace has an exit 15 through which hot glass sheets move into roll forming section.

A conveyor is provided for the furnace and the first portion of the roll forming section. The conveyor comprises a plurality of furnace conveyor rolls 16, each extending transversely of the furnace in longitudinally spaced relation along the length of the furnace to provide transversely extending, longitudinally spaced rotating lines of support for propelling glass sheets through the furnace, transfer rolls 18, a pivot roll 20 and a first series of additional conveyor rolls 22 mounted for rotational support on support housings 24. The latter are supported on a common horizontal frame housing (not shown) that pivots relative to the pivot roll 20.

The rolls 16, 18, 20 and 22 are cylindrical shafts. A common drive (not shown) drives conveyor rolls 16 and transfer rolls 18 in unison. A clutch (not shown) selectively couples the transfer rolls 18, the pivot roll 20 and the additional conveyor rolls 22 to the common drive for rotation in unison at a common peripheral speed or at a faster speed, if such is desired, to deliver a heated glass sheet through the exit of the furnace 10 to the roll forming section 11.

As stated previously, the frame that supports the support housings 24 pivots about a horizontal axis defined by the pivot roll 20 at the upstream end of the pivotable frame. The hot glass sheets transfer from a horizontal path along furnace conveyor rolls 16 and transfer rolls 18 and pivot roll 20 to an oblique downward path defined by additional conveyor rolls 22 of cylindrical configuration. Thus, the pivot roll 20 and the additional conveyor rolls 22 are supported to define an obliquely downwardly extending path beyond the transfer rolls 18 at the furnace exit. The obliquely downward orientation of the additional conveyor rolls 22 relative to the pivot roll 20 is an important feature in obtaining rapid and controlled curvature of glass sheets from a flat to a curved configuration during their transfer from the furnace 10 to the cooling section 14.

A roof structure 26 is mounted over the additional conveyor rolls 22 between the furnace exit 15 and the cooling station 14. The roof structure has a downwardly facing surface of a heat-reflecting material such as a thin sheet of aluminum. The roof structure prevents premature cooling of glass sheet conveyed through the transition portion of the roll forming section. Means 27 is provided to raise or lower the roof structure 26 to provide access to the rotatable forming rolls 31 and 32, the pivot roll 20, the additional conveyor rolls 22 and the pivotably supported mounting frame (not shown) to which the additional conveyor rolls 22 are mounted.

The transition portion 12 of the roll forming section 11 comprises a plurality of forming rolls 31 to 36 mounted on rotatable shafts 40. Each forming roll is driven from a common drive mechanism 41 and extends through a pair of support brackets 42 and 44. The latter are rigidly mounted to a rigid support structure 46 having vertical standards 48 and shims 78 to adjust the vertical positioning of each support bracket 42 and 44 individually.

The support housings 24 are transversely aligned with one another and are spaced longitudinally relative to one another so that the extensions of the shafts of the additional conveyor rolls 22 can pivot with the pivotable frame housing to an obliquely downward orientation wherein the successive additional conveyor rolls 22 are disposed at successively lower elevations relative to the elevations provided by the forming rolls supported on the shafts 40.

Successive lower forming rolls 53, 55, 57, 59 and 61 and additional upper forming rolls 63, 65, 67, 69 and 71 are located in the downstream portion 13 of the roll forming section 11 and are arranged as pairs in spaced relation downstream of one another. An additional lower forming roll 77 is located beyond lower forming roll 61 and upstream of the cooling station 14.

Each of the forming rolls 53 through 71 and 77 is composed of a curved rod 40 about which are mounted loosely interfitting short segments 70 and a spring 74 that applies an axially directed force to maintain the segments in interfitting relation. Each rod 40 has a transverse curvature of concave elevation transverse to the path defined by the first series of additional conveyor rolls 22. Each segment is composed of a material having a low thermal conductivity, a low coefficient of thermal expansion over a wide range of temperatures and a chemical composition that does not react chemically with glass. In addition, the material selected for the segments is durable over a wide temperature range and one that makes the segments readily shaped or machined to curved contours. A typical structure for a curved segmented forming roll is depicted in U.S. Pat. No. 4,311,509 to William D. Reader and Terry L. Wolfe.

Each of the additional conveyor rolls 22 is disposed approximately midway between adjacent forming rolls 31 to 33 of the transition portion 12. The additional conveyor rolls 22, the pivot roll 20 and the transfer rolls 18 are of relatively small diameter and are composed of thin metal shafts (preferably stainless steel) covered with a fiber glass sleeve or tape or with a hard ceramic coating.

Each support bracket 42 and 44 and the corresponding vertical standards 48 of the rigid support frame 46 is provided with aligned apertures and is spaced above the corresponding vertical standard by a distance determined by a shim 78 disposed between each vertical standard 48 and its corresponding support bracket 42 or 44 and provided with aligned apertures to receive attachment bolts and nuts. By providing shims 78 of different thickness along the length of the roll forming section 11, the forming rolls 31 to 36, 53 to 61 and 77 are supported at spaced transverse lines along a smooth arcuate path of substantially constant radius of curvature correlated with the longitudinal component of shape desired for a glass sheet to be shaped to a compound shape.

If it is desired to impart a simple bend to the glass sheets comprising a curvature in a direction transverse to the path of glass sheet movement, the thicknesses of the shims 78 supporting each of the support brackets 42 and 44 are equal so as to space each of the bearing brackets a uniform distance above the respective vertical standards 48 of the rigid support frame.

The roll forming section 11 also comprises a plurality of vertical adjustment members 80 interconnecting a pair of upper horizontal transversely extending support members 81 with a corresponding pair of lower horizontal members 82. Each of the upper members 81 forms part of an upper support housing 83 that supports mounting brackets 84 in spaced relation therebelow. Upper shims 85 are provided for each mounting bracket 84. The mounting brackets 84 support shafts 40 of the upper forming rolls 63, 65, 67, 69 and 71 in alignment over the shafts 40 of the corresponding lower forming rolls 53, 55, 57, 59 and 61 in the downstream portion 13 of the roll forming section 11.

The thicknesses of the shims 85 mounted to the members 82 are related to the thickness of the corresponding shims 78 supporting the brackets 44 so that lower forming rolls 53, 55, 57, 59 and 61 of the pairs of forming rolls, which are directly opposite upper forming rolls 63, 65, 67, 69 and 71, are supported in gradually decreasing vertical space below the corresponding upper forming rolls until the downstream pair of forming rolls 71 and 61 are separated vertically by a spacing slightly more than the thickness of glass sheets passing therebetween.

The upper support housing 83 has an oblique downwardly facing wall 79 of heat-reflecting material, such as thin aluminum sheeting, facing downwardly toward the upper surface of moving glass sheets and in an upstream direction toward the furnace 10. The heat-reflecting wall 79 faces the downstream portion 13 of the roll forming section 11 and cooperates with the heat-reflecting lower surface of the roof structure 26 in the upstream portion 12 to control the temperature loss in glass sheets when the latter traverse the roll forming section 11. The obliquely downward and upstream orientation of the heat-reflecting wall 79 minimizes heat radiated in a downstream direction toward the cooling section.

Means 78 is provided to raise or lower the upper support housing 83 relative to the transversely extending support members 81. The means is important to provide access to the rotatable forming rolls in the roll pressing portion 13.

Figure 7:
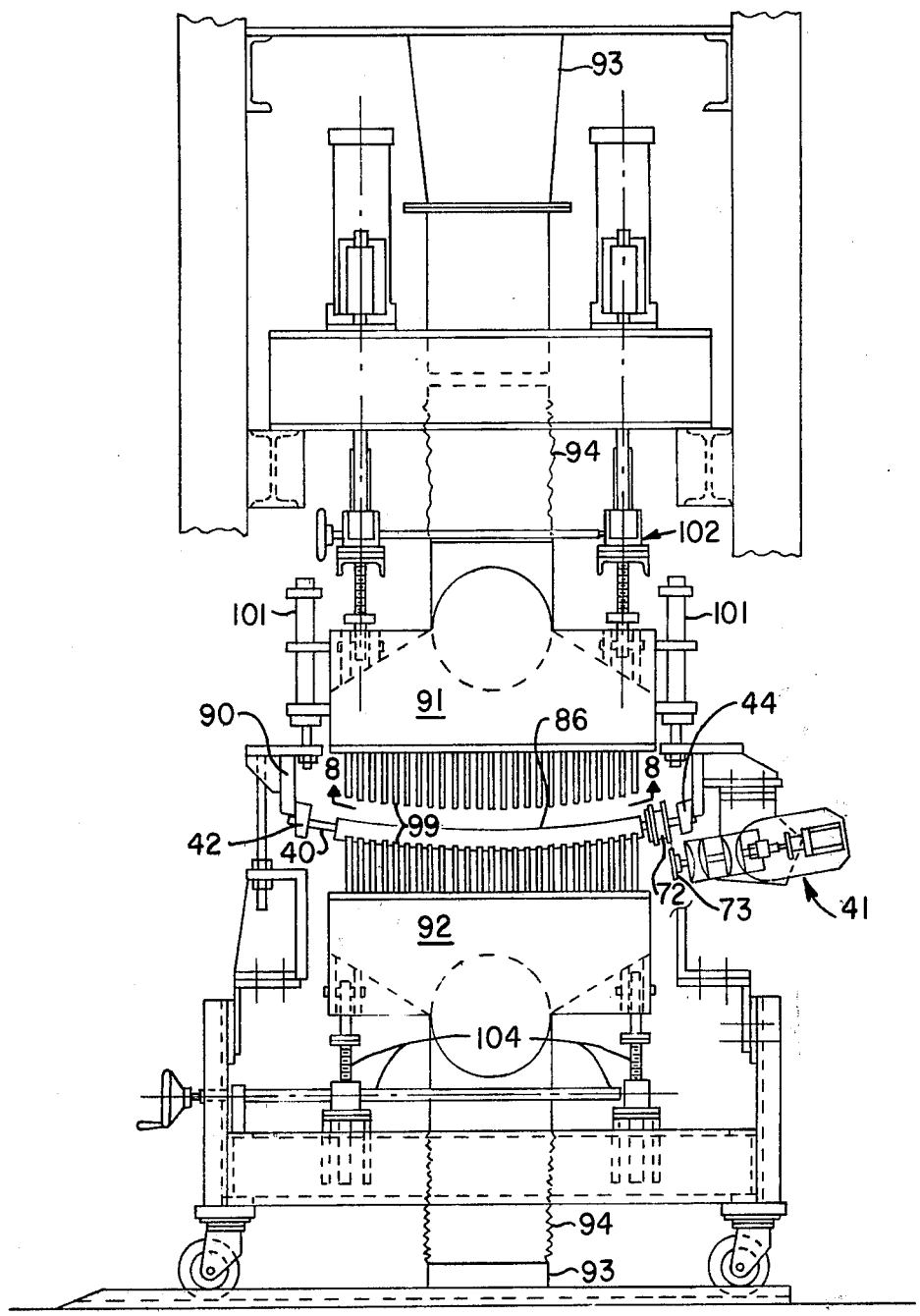
FIG. 7 is a transverse, vertical sectional view of a cooling section of said apparatus taken along the line 7—7 of FIG. 1.
Figure 8:
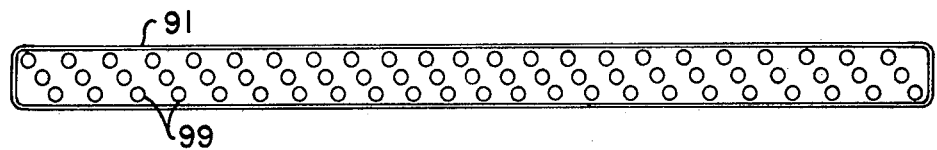
FIG. 8 is a horizontal, upward sectional view taken along the line 8—8 of FIG. 7.

Beyond the forming section 12 there is a cooling section 14. In the cooling section 14, a succession of curved support rolls 86, 87, 88 and 89, etc. transversely shaped in concave elevation similar to forming rolls 53 to 61 and 77 is provided. The curved support rolls 86 to 89 thus provide additional curved supports for the shaped glass sheets delivered to the cooling section 14. The cooling section 14 is depicted in cross section in FIG. 7 and in plan in FIG. 8.

The curved support rolls 86 to 89 in at least the upstream portion of the cooling section 15 comprise curved shafts 40 supported on adjustably mounted support brackets 42 and 44 disposed along a continuation of the curved path of constant radius provided by the forming rolls 31 to 36 and the lower forming rolls 53 to 61 and the additional forming roll 77. The arcuate path taken by the shaped glass sheets is uninterrupted from the roll forming section into the upstream portion of the cooling section until a location is reached where the surfaces of each conveyed glass sheet are sufficiently hard to retain its shape when tilted onto the remainder of the conveyor extending horizontally at approximately the same elevation as the conveyor rolls in the furnace 10.

The cooling section 14 comprises mounting members 90 that slidably support the support brackets 42 and 44 and also comprises an upper plenum chamber 91 and a lower plenum chamber 92. Each of the plenum chambers communicates with a plurality of nozzle housings, each having nozzles 99 that extend from their associated nozzle housings distances determined by arcs having an average radius of curvature contemplated for the range of radii of transverse curvatures of the sheets processed. Apparatus designed to process glass sheets having transverse curvatures of 40 inches (1 meter) to 75 inches (1.9 meters) have the nozzles in each row terminating in curved lines that define an arc of a circle of approximately 60 inch (1.5 meter) radius.

Means 101 is provided for supporting and adjusting the vertical positions of the mounting members 90 supporting bearing housings for the curved support rolls 86 to 89 so that the curved path formed by the forming rolls can be continued uninterrupted into the cooling section 14 along the curved support rolls 86 to 89. Additional means 102 is provided to support and adjust the vertical position of the upper plenum chamber 91 and additional support and adjustment means 104 is provided to adjust the vertical position of the lower plenum chamber 92 so as to facilitate any access needed to perform repair and maintenance work and to provide gross adjustment of nozzle to glass distance. Such adjustment means are well known in the art and need not be further discussed at this point.

The individual nozzles 99 of circular cross-section in the illustrative embodiment are arranged in sets of three transversely extending rows, one set from each nozzle housing. Alternate nozzle housings for the lower nozzles are spaced apart longitudinally of the path of glass sheet travel sufficient distances to receive the curved support rolls 86 to 89. The nozzle housings extend transverse to the path of glass sheet movement through the cooling section and adjacent rows of round nozzles are disposed in offset relation to the rows of the immediately preceding and the immediately succeeding row of nozzles in each set. Upper and bottom nozzle housings face one another in nozzle to nozzle alignment and are spaced on opposite sides of the path of glass sheet travel defined by the curved surfaces defined by longitudinal lines tangent to the upper curved surfaces of the curved support rolls 86 to 89.

A preferred driving system for the rolls of this apparatus comprises a first driving mechanism that drives the furnace conveyor rolls 16, the transfer rolls 18, the pivot roll 20 and the additional conveyor rolls 22 in unison, a second driving mechanism that drives forming rolls 31 to 36, lower forming rolls 53 to 61, additional forming roll 77 and curved support rolls 86 to 89 in unison and a third driving mechanism that drives the upper forming rolls 63 to 71 in unison. However, a common driving mechanism 41 may be provided for rotating the furnace conveyor rolls 16, the transition rolls 18, the pivot roll 20, the additional conveyor rolls 22, the forming rolls 31 to 36, the additional forming rolls 53 to 61, the additional lower forming roll 77 and the curved support rolls 86 to 89 in the upstream portion of the cooling section 14 through a driving sprocket 73 rotated by driving mechanism 41. The sprocket 73 is coupled through a chain drive (not shown) to a sprocket on one of the double sprockets 72. Additional chain drives (not shown) interconnect alternate inner and outer sprockets of the double sprockets 72 in a manner well known in the art. The number of sprocket teeth provided for the sprockets 72 at the driving end of each of the aforesaid rolls is designed to provide uniform peripheral speed from roll to roll. Uniform peripheral roll speed from roll to roll insures that glass sheets do not become skewed or deviate from their transverse alignment relative to the desired path of movement of the glass sheets through the furnace 10, the roll forming section 12 and the cooling section 14. In this embodiment, an additional common driving mechanism (not shown) is provided to rotate the upper forming rolls 63 to 71 in unison. However, as many drive mechanisms as is desired may be used to drive different portions of the conveyor rolls or forming rolls or curved support rolls in any combination of rolls desired for different portions of the apparatus without departing from the gist of this invention.

The uniformity of shaping each sheet treated will be understood from the repetitive program of operation that the rolls perform on each successive glass sheet in a series of sheets treated by the apparatus, particularly when a glass sheet in the series traverses a roll forming section that comprises a roll pressing portion constructed and arranged in the manner conforming to the present invention.

As each longitudinal increment of a representative glass sheet passes over the rotating pivot roll 20, the latter momentarily engages the entire width of the sheet and propels the sheet downstream. A short distance downstream, the first rotating forming roll 31 engages only the longitudinal side edges of the glass sheet increment. In the meantime, a succeeding longitudinal increment is momentarily supported across the transverse dimension of the sheet by rotating pivot roll 20.

Since each of the succeeding additional conveyor rolls 22 is at a lower elevation than its immediately preceding additional conveyor roll, and since the forming rolls 31 to 36 in the transition portion 12 of the roll forming section 11 are disposed along a straight line path or an arcuate path of concave elevation that is not as steep in declining elevation as the obliquely downward extending straight path defined by the spaced additional rotating conveyor rolls 22, gradually the glass sheet is transferred by longitudinal increments from momentary support on straight lines of support across the entire transverse dimension to a combination of momentary supports comprising curved lines of momentary support of gradually increasing length along an increasing portion of its longitudinal side edge portions extending transversely inward thereof and gradually decreasing straight lines of momentary support extending gradually decreasing distances transversely of its centrally disposed area.

When the longitudinal increment of the glass sheet reaches the first additional conveyor roll 22, it is momentarily supported along a substantial portion of its transverse dimension along its central portion on the first additional rotating conveyor roll 22. A short distance downstream therefrom a slightly longer transverse extremity portion at each side edge of the glass sheet is momentarily supported on the concavely curved rotating surface of the second forming roll 32 than was supported upstream on the first forming roll 31. The second additional conveyor roll 22 then provides a shorter straight line of momentary support along a smaller central portion at a short distance downstream from rotating forming roll 32, and shortly afterward, rotating forming roll 33 provides a transversely curved support in momentary rolling engagement for a slightly longer transverse end portion at each transversely opposite end portion of the glass sheet increment than was provided previously by forming roll 32.

The succeeding additional rotating forming rolls 34, 35 and 36 provide longer and longer curved lines of momentary support along the opposite transverse extremities for the glass sheet than each previous forming roll as the moving glass sheet sags to conform to their curved shapes. By the time the glass sheet increment reaches rotating forming roll 36, approximately the entire transverse dimension of the glass sheet is momentarily supported on the transversely curved shaping surface of forming roll 36.

It is understood that the number of shaped rolls in the first portion of the roll forming section illustrated is exemplary, and the number may be increased or decreased depending on many factors such as size and thickness of glass sheets processed, complexity of bend, etc. Also, the downward slope of the common upper tangent of additional conveyor rolls 22 may be adjusted in view of these factors.

Since a considerable portion of the central area of the glass sheet is simultaneously supported momentarily while the forming rolls begin to engage the glass sheets momentarily at their transverse end portions in the first portion of the roll forming section, the amount of tip curl imparted to the glass sheets is controlled to a considerable extent compared to roll forming practices of the prior art where the entire mass of the glass sheet was supported initially on the transverse edge portions while rolling over the curved shaping rolls. Nevertheless, glass sheets conveyed on additional curved shaping rolls tend to develop tip curl in their transverse side portions. The downstream portion of the roll forming section of this apparatus embodiment reduces tip curl regardless of how the forming rolls are constructed or arranged in the upstream portion of the roll forming section.

Figure 4:
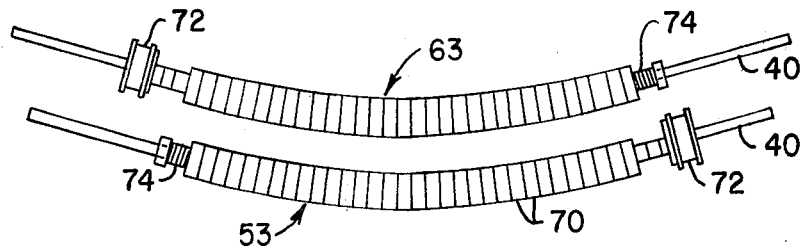
FIG. 4 is a sectional view taken along the line 4—4 of FIG. 3.

As the shaped glass sheet enters the downstream portion of the forming section, approximately its entire width is supported momentarily on the first additional rotating forming roll 53 in closely spaced relation below corresponding upper forming roll 63 except for its tips which may begin to curl upward. FIG. 4 shows rolls 53 and 63 separated vertically by a distance considerably greater than the glass sheet thickness.

Figure 5:
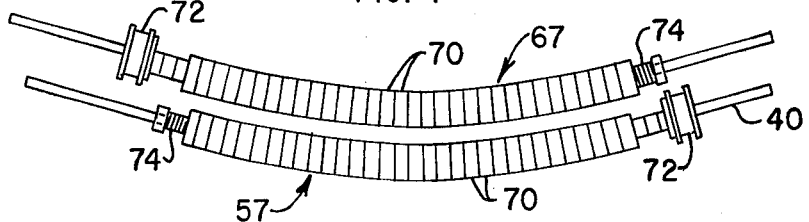
FIG. 5 is a sectional view taken along the line 5—5 of FIG. 3.
Figure 6:
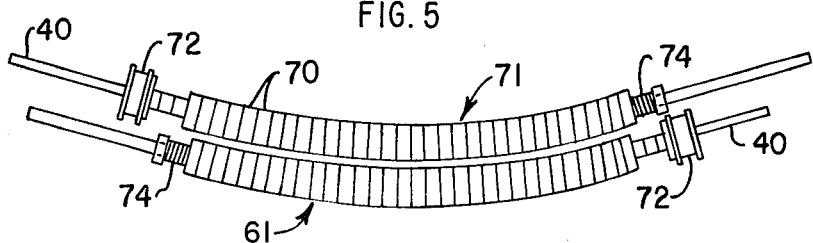
FIG. 6 is a sectional view taken along the line 6—6 of FIG. 3.

One purpose of providing upper and lower shaping rolls of complementary curvature in the downstream portion 13 of the roll forming section 11 is to maintain the shape of the glass that is imparted by successive momentary supports by the forming rolls 31 to 36 in the upstream portion 12 of the forming section 11 within tolerance limits. It has been found that if each succeeding pair of upper and lower forming rolls is arranged in gradually decreasing separation in a downstream direction along the path of glass sheet travel, that tip curl is slightly reduced during passage of the glass sheet between the first pair of relatively widely spaced rolls 53 and 63 shown in FIG. 4. Tip curl is further reduced without hindering passage of the glass sheets between slightly more closely spaced rolls 55 and 65, and still further reduced without hindering passage between the intermediately spaced rolls 55 and 65 depicted in FIG. 5, and still further reduced during passage between lesser spaced rolls 59 and 69 and reduced to a bare minimum during their passage between rolls 61 and 71, which are spaced from one another only barely more than the thickness of the glass sheets being processed.

It will be seen from the foregoing description that each of a series of glass sheets, after being conveyed through a hot furnace, is delivered at a deformation temperature to a roll forming section where each glass sheet sags by gravity as it moves over the curved forming rolls 31 to 36 in the transition portion 12 so as to gradually impart a transverse curvature thereto. In order to minimize the development of tip curl along the side edge portions of the glass sheets shaped by gravity sagging, the sagged glass sheets are transported over additional lower forming rolls 53 to 61 and toward the cooling section 14 in sequentially more closely spaced relation to upper forming rolls 63 to 71 until the shaped glass sheets pass between the most closely spaced pair of forming rolls 61 and 71.

The optional heat-reflecting roof structure 26 in the upstream portion 12 of the roll forming section 11 and the oblique heat-reflecting lower wall 79 in the downstream portion 13 reduce premature cooling of the glass sheets prior to their arrival at the cooling section and also reduce the tendency of the radiant heat in the roll forming section to radiate downstream into the cooling section to warm the blasts of tempering medium applied against the glass sheets when the latter traverse the cooling section.

Flat glass sheets as thin as ⅛ inch (3.2 millimeters) nominal thickness have been shaped and tempered at an acceptable production rate using this apparatus. This has been accomplished without requiring any movement of the forming rolls except for rotation. Glass sheets are heated to attain a temperature in the range of approximately 1150° F. to 1220° F. (620° C. to 660° C.) at the furnace exit 15 and are cooled at slower than natural rates for about 4 seconds while traversing the roll forming section 11 which occupies the space between the furnace exit 15 and the first row of nozzles in the cooling section 14.

When flat glass sheets are heated to above their distortion temperature and then cooled rapidly to below their strain pint, the glass is tempered. When the glass sheets are cooled so that their opposite surfaces cool at different times to below the strain point, the tempered sheets are distorted. However, in thin glass sheets, the warped glass is likely to flex between metastable states even when the opposite surfaces are chilled at drastically different rates. This tendency to flex has not been observed with glass sheets that are first shaped by gravity sagging while conveyed over rotating forming rolls followed by roll pressing between pairs of spaced, additional forming rolls spaced decreasing distances therebetween along the glass sheet travel path to reduce tip curl and then altered in shape by differential cooling from above the deformation temperature to below the strain point of the glass.

In production runs, a series of glass sheets were shaped to a given first configuration of concave elevation by gravity sagging followed by roll pressing in the manner described previously and then chilled more rapidly at their upper major surfaces than their lower major surfaces. Such treatment reduced the radius of curvature of said glass sheets so treated.

The present invention contemplates adjusting the absolute as well as the relative cooling rates of the opposite glass sheet surfaces by controlling relative upward and downward plenum pressures. Thus, a single configuration of rotating forming rolls of one traverse elevational curvature arranged along a sweep line of a predetermined longitudinal curvature may be used to impart a first compound configuration to the glass sheets desired to be shaped to any one of several different configurations. Different final configurations can be obtained from a common first configuration by providing different arrangements of upper and lower plenum pressures that provide different cooling rates to the opposite glass sheet surfaces in the cooling section. Simple experimentation based on how much a glass sheet deviates from ultimate curvature (that is, whether it develops too much sag or too little sag after the correction of the first configuration) can "fine-tune" an adjustment. Generally, increasing the excess of upper plenum pressure relative to a lower plenum pressure or decreasing the deficiency of lower plenum pressure relative to an upper plenum pressure increases the sag and reduces the radius of curvature. On the other hand, decreasing the excess of upper plenum pressure or decreasing the deficiency of lower plenum pressure decreases the sag and increases the radius of curvature of concavely shaped sheets.

When all of the shafts 40 that rotatably support the forming rolls 31 to 36, the additional lower forming rolls 53 to 61, the additional forming roll 77 and the curved support rolls 86 to 89, etc., are supported along a horizontal plane by using shims 78 of equal height, such an arrangement produces a cylindrical bend or a bend of non-uniform radius of curvature about an axis extending along the path of glass movement. It is understood that the use of shims to develop a straight or arcuate line of curvature longitudinally of the path of glass sheet travel is exemplary, and that many alternate techniques may be used to adjust the roll support positions without departing from the gist of this invention.

The previously described embodiments relate to method and apparatus for shaping glass sheets from a flat to various curved configurations that incorporate at least one component of curvature that is concave in elevation. It is also within the gist of the present invention to change the shape of glass sheets from a flat to a curved configuration that includes at least one component of curvature that is convex in elevation. This latter convex curvature component may be combined with a second component that is either convex or concave in elevation or essentially flat. In all instances, the forming rolls, the conveyor rolls and the curved support rolls in the cooling section are rigidly supported by adjustable support housings in apparatus for producing these alternate shapes.

For example, to produce a transverse curve of convex elevation, the roll forming section of the first embodiment is modified to provide, in combination with the additional coveyor rolls 22 of cylindrical configuration that are rigidly supported in a desired longitudinally oblique path along the upstream portion 12 of the roll forming section 11, rigidly supported forming rolls of convex transverse elevational configuration. In this embodiment, the pairs of rigidly supported forming rolls in the downstream portion 13 of the roll forming section 11 are also convex in transverse elevation. As in previous embodiments, the upper forming rolls of adjacent pairs of rolls are closely spaced with gradually decreasing space between the rolls of successive pairs until the spacing barely exceeds the glass sheet thickness in the downstream pair. Furthermore, in this alternative embodiment, the curved support rolls in the upstream portion of the cooling section have a transverse elevational configuration of convex elevation.

When it is intended to develop a compound shape of longitudinal convex curvature combined with a transverse curvature of convex elevation in glass sheets, the tangent common to the upper surfaces of the additional conveyor rolls is tilted downward relative to an arcuate curve defined by convexly shaped forming rolls, thereby exposing each longitudinal increment of a heat-softened glass sheet to alternate support by a roll of cylindrical configuration on progressively lesser lengths of transversely extending straight lines of support and progressively greater lengths of transversely extending curved lines of support of convex elevation until the heat-softened glass sheet is supported at longitudinally spaced lines of support having a transversely extending convex elevation. The upper forming rolls of convex elevation are rigidly supported in closely spaced relation over the corresponding lower forming rolls of convex elevation of complementary curvature of each succeeding pair of forming rolls in the roll pressing portion 13 so as to provide barriers at the downstream end of the roll forming section to inhibit the backward flow of tempering medium to the upstream portion of the roll forming section, and also to permit passage of the glass sheets between the roll pairs simultaneously with reducing tip curl in increments from roll pair to roll pair as in the first embodiment.

In all instances, after the glass sheets have their surfaces hardened by exposure to the blasts of tempering medium in the upstream portion of the cooling section, the shaped glass sheets can continue on a longitudinal path through the cooling section that departs from the longitudinally curved path of convex elevation. However, as is the case with longitudinal paths of concave elevation, it is necessary to transport the glass sheets from forming rolls to forming rolls to curved support rolls in the cooling section along a longitudinally curved path of substantially constant radius of curvature until the glass sheets reach a location within the cooling section where the glass surface is sufficiently hard to enable the glass to transfer to additional curved support rolls disposed along a longitudinal path that departs from the constant radius of curvature without damaging the glass surface.

The use of roll forming apparatus containing a minimum of moving parts that shapes deformable glass sheets by sagging followed by roll pressing and optionally followed by further shaping by differential cooling of the upper and lower major glass sheet surfaces has resulted in a more uniform shape imparted to each sheet of any give production pattern and has resulted in high speed mass production. In addition, when the apparatus is constructed and arranged to rotate all of the conveyor and forming rolls that engage the bottom surface of the moving glass sheets at the same peripheral speed, the glass sheets move through the furnace, the roll forming section and the cooling section without becoming misaligned or skewed. This feature is especially important when the glass sheets are shaped to configurations more complicated than simple cylindrical shapes.

The form of the invention shown and described in this disclosure represents an illustrative preferred embodiment and certain modifications thereof. It is understood that other changes can be made without departing from the gist of the invention as defined by the claimed subject matter which follows.

What is claimed is:

1. A method of shaping a glass sheet comprising
heating the sheet to its deformation temperature in a furnace,
conveying said sheet along a path of travel beyond said furance while said sheet remains hot over a series of rotating forming rolls shaped to transverse elevational shape to sag the sheet by gravity to conform approximately to the transverse elevational shape of the last forming roll in said series, and
inhibiting the formation of tip curl in the vicinity of the transverse side edge portions of said gravity sagged sheet by pressing said sheet between a plurality of pairs of additional rotating forming rolls of complementary transverse elevational shape arranged with diminishing space between the rolls of each successive pair of said additional rotating forming rolls along said path of travel wherein the space between the last of said pairs of additional rotating forming rolls barely exceeds the thickness of said glass sheet.

2. The method as in claim 1, followed by cooling said glass sheet immediately after it leaves the space between said last pair of additional rotating forming rolls at a rapid rate sufficient to impart at least a partial temper to said glass sheet while conveying said glass sheet on curved support rolls disposed along a cooling section.

3. The method as in claim 2, wherein said glass sheet is cooled differentially by applying cold tempering medium against the opposite major surfaces of said glass sheet at sufficiently different rates to warp said glass sheet from the shape developed by said gravity sagging followed by said roll pressing.

4. The method as in claim 2 or claim 3, wherein said glass sheet is conveyed along the length of said furnace during its heating to its deformation temperature.

5. The method according to claim 4, comprising conveying said glass sheet on rotating conveyor rolls of cylindrical configuration through said furnace and providing said conveyor rolls with a peripheral speed approximating the peripheral speed of said rotating forming rolls, said additional rotating forming rolls and said curved support rolls in said cooling section to maintain said glass sheet along a path of movement while avoiding misalignment and skewing of said glass sheet relative to said path of movement.

6. The method according to claim 4, wherein said glass sheet is conveyed between said furnace and said additional conveyor rolls in said cooling section in facing relation to heat reflecting means to minimize temperature loss of said glass sheet during its conveyance over said rotating forming rolls and between said plurality of pairs of additional rotating forming rolls.

7. The method according to claim 1 or 2 or 3, wherein said glass sheet is oriented in an essentially horizontal orientation for movement along an essentially horizontal path of movement.

8. The method according to claim 7, wherein said essentially horizontal path of movement is along an essentially straight line defined by supporting said rotating forming rolls and the lower of said pairs of additional forming rolls along a straight line.

9. The method according to claim 7, wherein said essentially horizontal path of movement is along an arcuate path defined by supporting said rotating forming rolls and the lower of said pairs of additional forming rolls along an arcuate line.

10. The method according to claim 7, comprising imparting a transverse elevational shape of concave elevation by engaging said glass sheet with said rotating forming rolls and said pairs of additional rotating forming rolls of concave transverse elevation.

11. The method according to claim 7, comprising imparting a transverse elevational shape of convex elevation by engaging said glass sheet with said rotating forming rolls and said pairs of additional rotating formig rolls of convex transverse elvation.

12. The method according to any one of claims 8 to 11, wherein said glass sheet is one of a series of glass sheets.

13. A method of shaping a glass sheet while at deformation temperature comprising passing said sheet between pairs of rotating forming rolls of complementary transverse elevational shape arranged with diminishing space between the rolls of each successive pair along a path of travel including a downstream pair of rolls spaced from one another by a distance that barely exceeds the thickness of said glass sheet.

14. A method as in claim 13, wherein said glass sheet is one of a series of glass sheets.

15. Apparatus for shaping a glass sheet comprising a furnace and a roll forming section, said roll forming section comprising an upstream portion having a plurality of rotatable forming rolls shaped in transverse elevation and a downstream portion comprising a plurality of pairs of closely spaced, rotatable forming rolls of complementary shape arranged along a path of travel, the space between the rotatable forming rolls of said plurality of pairs diminishing in a downstream direction along said path of travel.

16. Apparatus as in claim 15, comprising means to support the last of said plurality of pairs of forming rolls at a spacing from one another barely exceeding the thickness of said glass sheet.

17. Apparatus as in claim 15 or 16, wherein said upstream portion comprises a plurality of rotatable forming rolls of gradually increasing severity of transverse elevational shape.

18. Apparatus as in claim 15 or 16, wherein said upstream portion comprises a plurality of rotatable conveyor rolls of cylindrical shape alternating with said rotatable forming rolls shaped in transverse elevation.

19. Apparatus as in claim 15 or 16, wherein said rotatable forming rolls and said additional rotatable forming rolls are supported along a straight line of support in the direction of said path of travel.

20. Apparatus as in claim 15 or 16, wherein said rotatable forming rolls and said additional rotatable forming rolls are supported along an arcuate line of support in the direction of said path of travel.

21. Apparatus as in claim 15 or 16, wherein said rotatable forming rolls and said additional rotatable forming rolls are shaped to have transverse concave elevation.

22. Apparatus as in claim 15 or 16, wherein said rotatable forming rolls and said additional rotatable forming rolls are shaped to have transverse convex elevation.

23. Apparatus as in claim 15 or 16, further including a cooling section located downstream of said downstream portion of said roll forming section along said path of travel, further comprising heat-reflecting surface means in facing relation to said rotatable forming rolls and said additional rotatable forming rolls along the length of said roll forming section.

24. Apparatus as in claim 23, wherein at least a portion of said heat-reflecting surface means in the downstream portion of said roll forming section is oriented obliquely downward and upstream.

* * * * *

UNITED STATES PATENT AND TRADEMARK OFFICE
CERTIFICATE OF CORRECTION

PATENT NO. : 4,381,933

DATED : May 3, 1983

INVENTOR(S) : Stephen J. Schultz et al.

It is certified that error appears in the above-identified patent and that said Letters Patent is hereby corrected as shown below:

Column 21, Claim 1, line 25, subparagraph 2, "furance" should be--furnace--.

Column 22, Claim 11, line 28, "formig" should be --forming--.

Column 22, Claim 11, line 29, "elvation" should be --elevation--.

Signed and Sealed this

Nineteenth Day of July 1983

[SEAL]

Attest:

GERALD J. MOSSINGHOFF

Attesting Officer    Commissioner of Patents and Trademarks